United States Patent
Haartsen

(10) Patent No.: US 6,490,446 B1
(45) Date of Patent: Dec. 3, 2002

(54) UNCOORDINATED FREQUENCY HOPPING CELLULAR SYSTEM

(75) Inventor: Jacobus Cornelius Haartsen, Borne (NL)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/288,808

(22) Filed: Apr. 9, 1999

(51) Int. Cl.[7] .............................. H04Q 7/20; H04Q 7/38
(52) U.S. Cl. ..................... 455/422; 455/502; 455/503; 455/500; 375/132; 375/133; 701/214
(58) Field of Search .................. 455/561, 502, 455/503, 461, 432, 434, 435, 436, 437, 438, 439, 440, 441, 442, 443, 517, 524, 426; 375/132, 133; 701/214

(56) References Cited

U.S. PATENT DOCUMENTS

| | | | | |
|---|---|---|---|---|
| 6,018,667 A | * | 1/2000 | Ghosh et al. ................ | 455/502 |
| 6,061,573 A | * | 5/2000 | Goldberg .................... | 455/503 |
| 6,138,019 A | * | 10/2000 | Trompower et al. ........ | 455/436 |

* cited by examiner

Primary Examiner—William Trost
Assistant Examiner—Keith Ferguson
(74) Attorney, Agent, or Firm—Burns, Doane, Swecker & Mathis, L.L.P.

(57) ABSTRACT

An uncoordinated frequency hopping cellular system includes a mobile unit and a number of base stations. The mobile unit determines information pertaining to a set of base stations that are within a geographical region defined by a location of the mobile unit, and supplies, to at least one of the base stations in the set, the information pertaining to at least one other base station in the set. The information may include address information corresponding to the set of base stations, and may include clock offset information representing a difference between a clock value associated with said at least one of the base stations and a clock value associated with at least one of the other base stations in the set. As different mobile units supply information to the base station, the base station accumulates information about other base stations in the system. The base station supplies this accumulated information to mobile units, so that they may readily have information (e.g., address and/or synchronization information) for more readily establishing communication with base stations that they have not yet encountered.

57 Claims, 10 Drawing Sheets

| IDENTITY | CLOCK OFFSET | RSSI |
|---|---|---|
| BS1 | −2030 | −60 dBm |
| BS2 | +10 | −72 dBm |
| BS3 | −190 | −90 dBm |
| BS4 | −1 | − |
| BS5 | +130 | − |

FIG. 10a

| BSL1 | |
|---|---|
| IDENTITY | CLOCK OFFSET |
| BS2 | +2040 |
| BS3 | +1840 |
| | |
| | |

FIG. 10b

| BSL2 | |
|---|---|
| IDENTITY | CLOCK OFFSET |
| BS1 | −2040 |
| BS3 | −200 |
| BS5 | +120 |
| | |

FIG. 10c

| BSL3 | |
|---|---|
| IDENTITY | CLOCK OFFSET |
| BS1 | −1840 |
| BS2 | +200 |
| | |
| | |

FIG. 10d

| BSL4 | |
|---|---|
| IDENTITY | CLOCK OFFSET |
| | |
| | |
| | |
| | |

FIG. 10e

| BSL5 | |
|---|---|
| IDENTITY | CLOCK OFFSET |
| BS2 | −120 |
| | |
| | |
| | |

FIG. 12a — BSL1

| IDENTITY | CLOCK OFFSET |
|---|---|
| BS2 | +2040 |
| BS3 | +1840 |
| | |
| | |
| | |

FIG. 12b — BSL2

| IDENTITY | CLOCK OFFSET |
|---|---|
| BS1 | −2040 |
| BS3 | −200 |
| BS4 | −11 |
| BS5 | +120 |
| | |

FIG. 12c — BSL3

| IDENTITY | CLOCK OFFSET |
|---|---|
| BS1 | −1840 |
| BS2 | +200 |
| | |
| | |
| | |

FIG. 12d — BSL4

| IDENTITY | CLOCK OFFSET |
|---|---|
| BS2 | +131 |
| BS5 | +11 |
| | |
| | |
| | |

FIG. 12e — BSL5

| IDENTITY | CLOCK OFFSET |
|---|---|
| BS2 | −120 |
| BS4 | +131 |
| | |
| | |
| | |

BSL3

| IDENTITY | CLOCK OFFSET |
|---|---|
| BS1 | −1840 |
| BS2 | +200 |
| BS4 | +189 |
| | |
| | |

*FIG. 13c*

BSL2

| IDENTITY | CLOCK OFFSET |
|---|---|
| BS1 | −2040 |
| BS3 | −200 |
| BS4 | −11 |
| BS5 | +120 |
| | |

*FIG. 13b*

BSL5

| IDENTITY | CLOCK OFFSET |
|---|---|
| BS2 | −120 |
| BS4 | +131 |
| | |
| | |
| | |

*FIG. 13e*

BSL1

| IDENTITY | CLOCK OFFSET |
|---|---|
| BS2 | +2040 |
| BS3 | +1840 |
| | |
| | |
| | |

*FIG. 13a*

BSL4

| IDENTITY | CLOCK OFFSET |
|---|---|
| BS2 | +131 |
| BS3 | −189 |
| BS5 | +11 |
| | |
| | |

*FIG. 13d*

UNCOORDINATED FREQUENCY HOPPING CELLULAR SYSTEM

BACKGROUND OF THE INVENTION

The invention relates to frequency hopping (FH) radio systems. In particular, it relates to FH radio systems applied in a multi-cell or cellular application comprising fixed base stations and moving portables that while moving, connect from one base station to the other. The invention enables handovers to take place between FH base stations even if the base stations are by no means coordinated.

Since the widespread use of mobile telephony, cellular systems are well known and have reached a high level of maturity. Cellular systems typically comprise a mobile network with a number of base stations located at strategic positions, each base station covering a restricted area called a cell. Because adjacent cells partly overlap, a portable device can move from one cell to the other without losing contact with the mobile network. As the portable moves during a call, the connection is handed off from one base station to another, depending on the relative location of the portable with respect to the base stations.

To support the access to the network and the handover function, the base station typically transmits a predefined (known) radio signal, the so-called control channel or beacon. The control channel reveals the presence of the base station to the portable. Based on the signal strength of the control channel received in the portable, a decision can be made regarding which base station the portable should connect to before or during a call.

Control channels are fixed channels that can easily be found by the portables. They either use a dedicated frequency and/or time slot in Frequency Division Multiple Access (FDMA)- /Time Division Multiple Access (TDMA)-based systems, or a fixed spreading code in direct-sequence Code Division Multiple Access (CDMA)-based systems. In all cases, the carrier frequency on which the control channel is located is fixed, although it can differ per base station. All the portable has to do is to tune to the proper carrier frequency and scan the signals until a decodeable signal is found.

In systems based on frequency-hop CDMA, the situation is completely different. In these systems, the carrier frequency changes periodically according to a pseudo-random hop sequence. Therefore, it is difficult to build cellular systems with a FH system because FH control channels are difficult for the portable to find, especially when the portable has no knowledge of the hop timing and the hop sequence. In the past, FH has been applied in digital cellular systems like GSM in order to increase capacity through interference diversity; however, in these systems, it is only the traffic channels that hop, and never the control channels.

The search effort of a portable in a FH cellular system can be reduced considerably if the hopping between the base stations is coordinated. In this case, once the portable has synchronized to one base station, little effort is required to lock to other, nearby base stations, provided that their FH transmissions are coordinated with the current base station. Thus, the search effort in coordinated systems is only expended the first time the portable enters the mobile network, such as at power up when turning on the portable.

However, when the radio interface uses certain frequency bands, regulations and rules set by regulatory bodies, like the Federal Communications Commission (FCC) in the U.S. or the European Telecommunications Standard Institute (ETSI) in Europe, prohibit the coordination of base stations. An example is the unlicenced Industrial/Medical/Scientific (ISM) band at 2.4 GHz. To use this band, the radio system must spread its signals either by direct-sequence (DS) spreading, or by frequency-hop spreading. As was described above, cellular systems based on DS spreading are attractive to use because fixed carrier frequencies can be used to support the control channels. However, FH spreading is more robust in environments with unknown jammers and results in cheaper transceiver implementations. Unfortunately, the set of rules governing the ISM band do not permit the coordination of FH base stations. This hinders the deployment in this band of multi-cell and cellular FH systems that support, for example, handovers.

Even if a radio band is used in which regulations allow coordination of base stations, for low cost solutions coordination is undesirable. Base stations being used as access pints for wireless access to an existing wired network like PSTN, Ethernet, or any other conventional LAN, cannot rely on coordination and synchronization signals on the wireline. In such a case, a dedicated network would be required to deal with the mobility functions required by the access points. This is not an attractive solution. In the preferred case, an access point can be plugged in to a conventional wired backbone without requirements for coordination and synchronization signals.

It is therefore desirable to provide a system and method that applies frequency hopping in a communications system that performs handovers between uncoordinated base stations.

BRIEF SUMMARY OF THE INVENTION

It is therefore an object of the invention to provide an uncoordinated frequency hopping cellular system, a mobile unit for use in an uncoordinated frequency hopping cellular system, a base station for use in an uncoordinated frequency hopping cellular system, and methods for operating the mobile unit, the base station and the system.

In accordance with one aspect of the invention, the mobile unit determines information pertaining to a set of base stations that are within a geographical region defined by a location of the mobile unit. The mobile unit then supplies, to at least one of the base stations in the set, the information pertaining to at least one other base station in the set. In each base station, this information may be received and accumulated.

In another aspect of the invention, the information may include address information corresponding to the set of base stations.

In yet another aspect of the invention, the information may include clock offset information representing a difference between a clock value associated with said at least one of the base stations and a clock value associated with at least one of the other base stations in the set.

In still another aspect of the invention, mobile unit receives additional information from said at least one of the base stations, wherein the additional information includes information pertaining to at least one base station that is not in the set of base stations. For example, the addition information may include synchronization information pertaining to the at least one base station that is not in the set of base stations. This additional information may then be used to establish communication with said at least one base station that is not in the set of base stations.

The base stations may occasionally received updated information from more recent contact with mobile units.

Thus, in yet another aspect of the invention, the base stations may estimate a rate of clock drift between an own clock located within the base station and another clock located within another base station in the system.

In still another aspect of the invention, the base stations may use the estimated rate of clock drift to correct a stored clock offset value representing a difference between a clock value associated with the own clock and a clock value associated with said another clock located within said another base station in the system.

In yet another aspect of the invention, a mobile unit for use in an uncoordinated frequency hopping cellular system communicates with a first base station in the uncoordinated frequency hopping cellular system; and receives information from the first base station, wherein the information includes addresses and clock offset values of neighboring base stations in the uncoordinated frequency hopping cellular system.

In still another aspect of the invention, each of the clock offset values represents a difference between a clock value associated with the first base station and a clock value associated with a corresponding one of the neighboring base stations.

In yet another aspect of the invention, the mobile unit uses the information from the first base station to establish communication with at least one of the neighboring base stations.

In still another aspect of the invention, the mobile unit supplies additional information to the first base station, wherein the additional information includes address and clock offset information pertaining to another base station in the uncoordinated frequency hopping cellular system.

In yet another aspect of the invention, the mobile unit performs an inquiry procedure that yields the additional information.

BRIEF DESCRIPTION OF THE DRAWINGS

The objects and advantages of the invention will be understood by reading the following detailed description in conjunction with the drawings in which:

FIGS. 10a through 10e depict resultant base station lists resulting from the first mobile terminals activity in the system in accordance with the invention;

FIGS. 12a through 12e depict resultant base station lists resulting from the second mobile terminals activity in the system in accordance with the invention;

FIGS. 13a through 13e depict an exemplary set of completely filled base station lists in accordance with the invention.

DETAILED DESCRIPTION OF THE INVENTION

Figure 1:
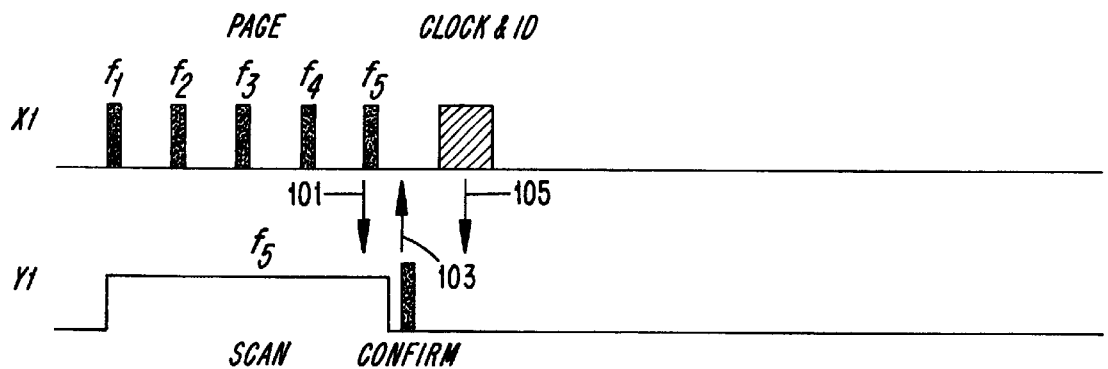
FIG. 1 depicts a paging procedure between two units in a frequency hopping communication system.

The various features of the invention will now be described with respect to the figures, in which like parts are identified with the same reference characters.

A preferred embodiment of the system described herein utilizes the FH radio air interface as described in U.S. patent application Ser. No. 08/685,069, ("Short-range radio communications system and method of use," by P. W. Dent and J. C. Haartsen), filed Jul. 23, 1996, and the method of channel access described in U.S. patent application Ser. No. 08/771,692, ("Access technique of channel hopping communications system," by J. C. Haartsen and P. W. Dent), filed Dec. 23, 1996. The U.S. patent applications Ser. Nos. 08/685,069 and 08/771,692 are hereby incorporated herein by reference. The considered air interface describes a so-called time-division duplex physical interface in which the transceiver alternately transmits and receives in order to support a duplex link. In addition, each time slot is transmitted at a different hop frequency according to a pseudo-random hop pattern. The hop pattern is determined by the identity of one of the units participating in the link. The phase in the hop pattern is determined by the native, system clock of that same unit. During connection setup, the identity and clock information are transferred from one unit to the other unit so that both can use the same hopping pattern and phase and thus stay in synchrony.

A unit in standby wakes up at regular intervals to scan for page messages. The hop frequency in which the unit wakes up is different for each new wake-up interval but is constant for the duration of the wake up interval. A unit that wants to connect to the unit in standby transmits the page message sequentially on a large number of different hop frequencies. It will first try on the frequencies close to the frequency it anticipates the unit in standby to wake up in. If no response is experienced, it will probe frequencies further away from the anticipated frequency. The anticipated frequency is obtained from a previous connection or a previous inquiry process. When the two units are connected, they then have accurate knowledge of each other's system clocks. The clock offsets are stored before disconnection so that they may be used for a later page attempt. In particular, the clock value of the other unit may be derived by adding the offset to the native system clock. Together with the identity which determines the hopping sequence, the two units can then quickly connect. After disconnection, the accuracy of the clock estimate depends on clock drifts. The larger the clock drift, the larger the uncertainty, and the longer it will take for a unit to connect to another unit.

Referring now to the exemplary signaling depicted in FIG. 1, once a page arrives at the recipient (step 101), the recipient returns a confirmation (step 103). Upon receipt of this confirmation, the paging unit sends a message including the paging unit's identity and system clock (step 105). Upon receipt of this information, the recipient uses the identity and the clock values to synchronize to the paging unit and continue the connection. A more detailed description of the access procedure is described in the above-referenced U.S. patent application Ser. No. 08/771,692.

Figure 2:
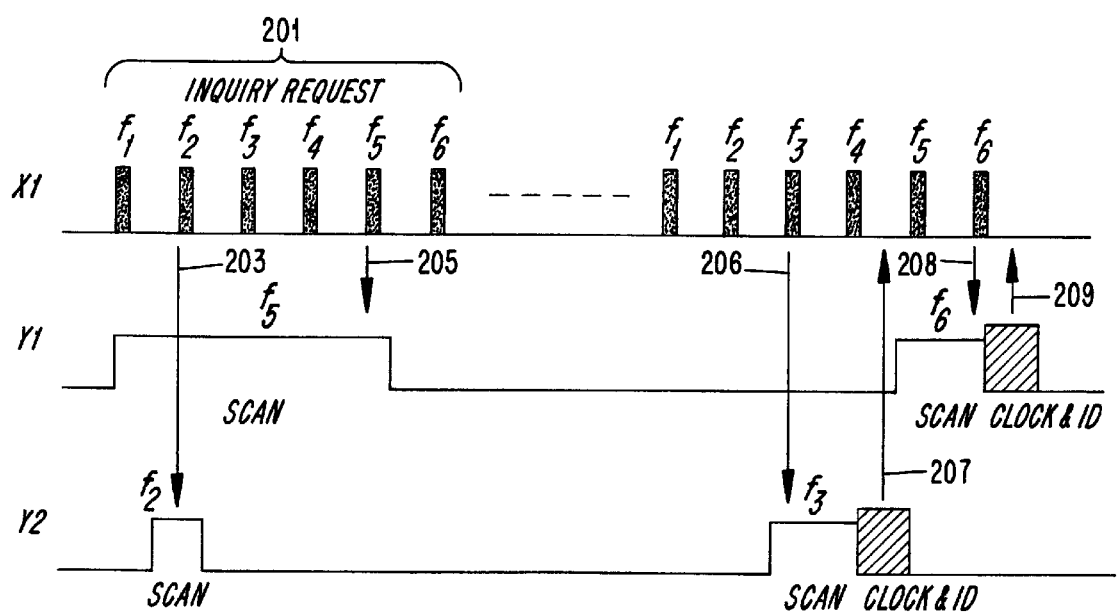
FIG. 2 depicts an inquiry procedure in accordance with one aspect of the present invention.

Based on the access procedure as described in the above-referenced U.S. patent application Ser. No. 08/771,692, an inquiry procedure will now be described with reference to FIG. 2. In some respects, the inquiry procedure is similar to the paging procedure, although there are also important distinctions. The inquiring unit X1 transmits an inquiry request message sequentially on all hop frequencies (step 201). If the message reaches a recipient (e.g., either of the messages 203, 205 reaching the respective units Y1 or Y2), the recipient (Y1, Y2) will start a procedure to respond with a message containing the recipient's identity and clock. This is the opposite of what happens in the paging procedure, in which it is the recipient that receives a message containing the pager's identity and clock values. During the inquiry procedure, the inquirer X1 receives many responses, in principle from all units in range. In preferred embodiments, a procedure is included to prevent two recipients from transmitting simultaneously and thus colliding at the receiver of the inquirer X1. Upon reception of the first inquiry request message (e.g., steps 203, 205), the recipient waits a random time interval before it listens for inquiry request messages again. When the recipient (e.g., Y1 and/or Y2) listens again after the random waiting period and receives the inquiry request message for the second time (this time on a next frequency in the respective hopping sequence) (steps 206, 208), it responds directly to the inquirer X1 with a message containing its identity and clock values (steps 207 and/or 209). Because the waiting time is randomized, the return messages are randomized, which reduces the probability that return messages of different recipients will collide.

Figure 3:
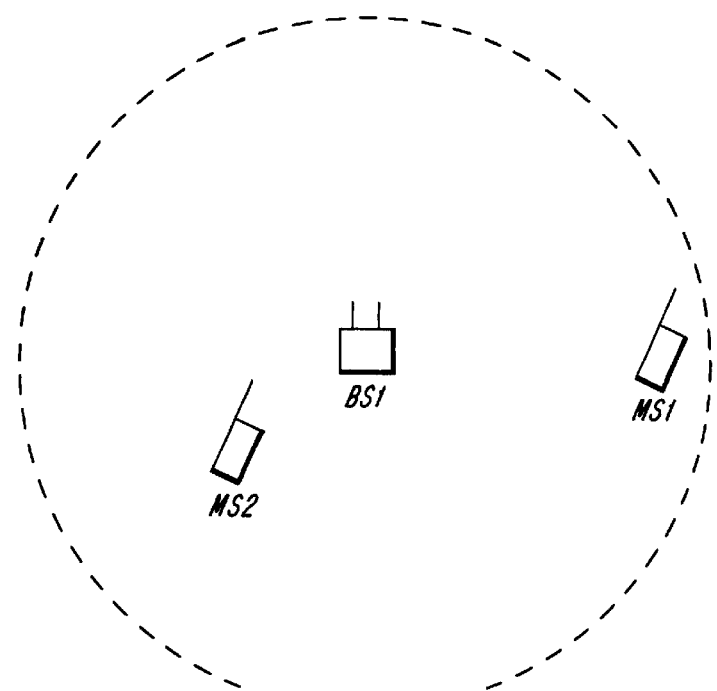
FIG. 3 depicts a conventional single-cell system in which a fixed cell is determined by the range of base station's control channel.

The concept of paging and inquiry as described above and in the above-referenced documents will now be used to construct a single-cell and multi-cell wireless system. A conventional single-cell wireless system is shown in FIG. 3. It consists of a base station BS1 at a fixed location. This base station is connected to a wired network, such as a PSTN or ISDN network (not shown). To reveal its presence to moving terminals, the base station transmits a beacon or control channel. A terminal (e.g., either of the mobile stations MS1 or MS2) roaming around within the coverage area of the base station BS1 periodically scans for the beacon. Once in range of the base station, it locks to the beacon and "camps" on the cell.

Figure 4:
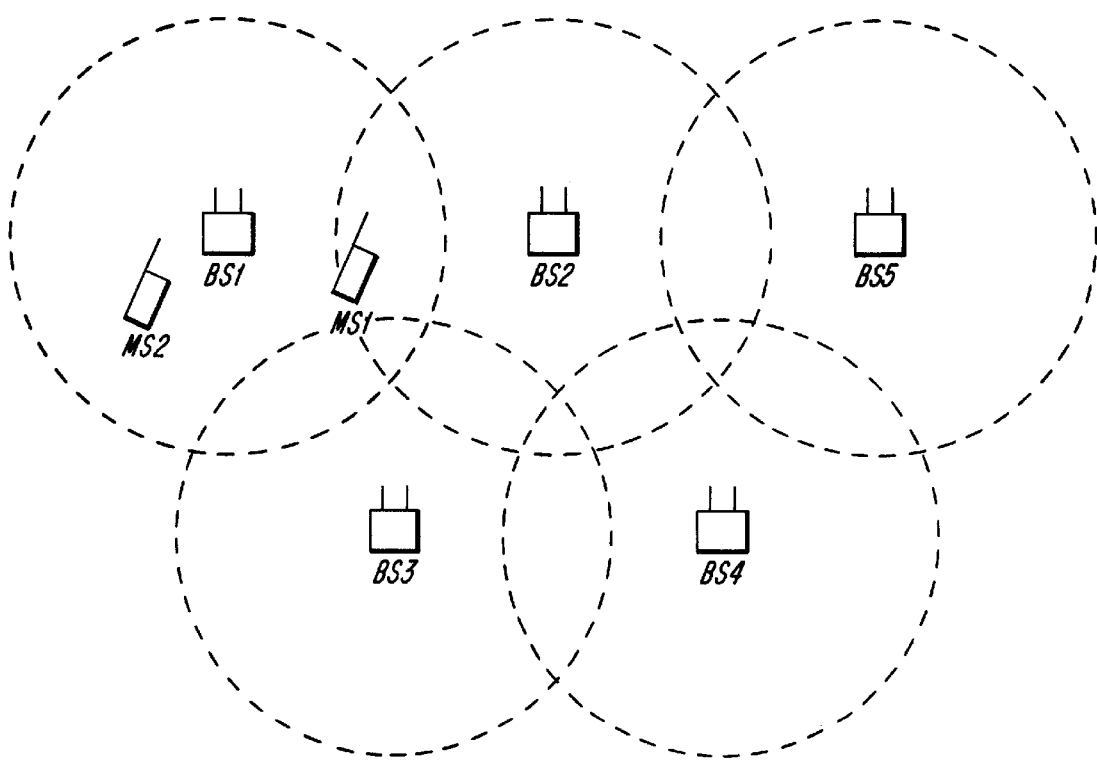
FIG. 4 depicts a conventional multi-cell system in which fixed cells are determined by the range of each base station's control channel.

FIG. 4 depicts the situation in a multi-cell environment. Basically, the same procedures are used. Multiple base stations (BS1, BS2, BS3, BS4, BS5) cover an area, with each base station defining its own cell as depicted by the dashed lines in FIG. 4. A terminal roaming within the covered area scans for the beacon or control channels transmitted by the base stations and typically camps in the cell whose base station signal is received the strongest. For example, the mobile terminal MS2 might camp on BS1. Another mobile terminal MS1 is in the service area of two base stations, namely BS1 and BS2, and can therefore choose to camp on either of BS1 or BS2. Assuming that BS1's signal is received stronger than BS2's signal, the mobile terminal MS1 will choose to camp on BS1. When the terminal is in connection with one base station but moves into the cell of an adjacent base station (e.g., the terminal MS1 may be moving from the coverage area of BS1 to the coverage area of BS2), the current base station BS1 can handover the connection to the new base station (BS2). Usually, interaction of the terminal is required to initiate a contact to the new base station. Before that, it already has locked to the control channel of the new base station. So during a handover, the terminal is locked to both base stations for a short time.

As was described in the background section, problems arise if the control channel or beacon hops in the frequency domain. In that case, it takes quite some effort of the terminal to find the beacon. This problem can be solved by using the paging and inquiry techniques as described above. In alternative embodiments of the invention, the base station either does not transmit anything, or else it transmits a beacon at a very low duty cycle (this beacon can be used to lock or "park" low-power devices, see also U.S. provisional application Ser. No. 60/071,262, filed on Jan. 13, 1998 and entitled "Central multiple access control for FH radio network," by J. C. Haartsen and J. Elg, which is hereby incorporated herein by reference). In either case, the terminal finds the base station by sending an inquiry request. Upon receipt of the inquiry response message from the base station, the terminal has full knowledge of the base station's identity and timing (e.g., clock value) and can quickly access the base station via a page from terminal to base station. When contact is made, the base station can inform the terminal of the low duty cycle FH beacon channel supported by the base station, if any. When no connection is desired, the terminal can be released and permitted to return to the idle mode. If the base station supports a beacon channel, the terminal now has all the knowledge necessary for locking onto this beacon while in idle mode.

Figure 5:
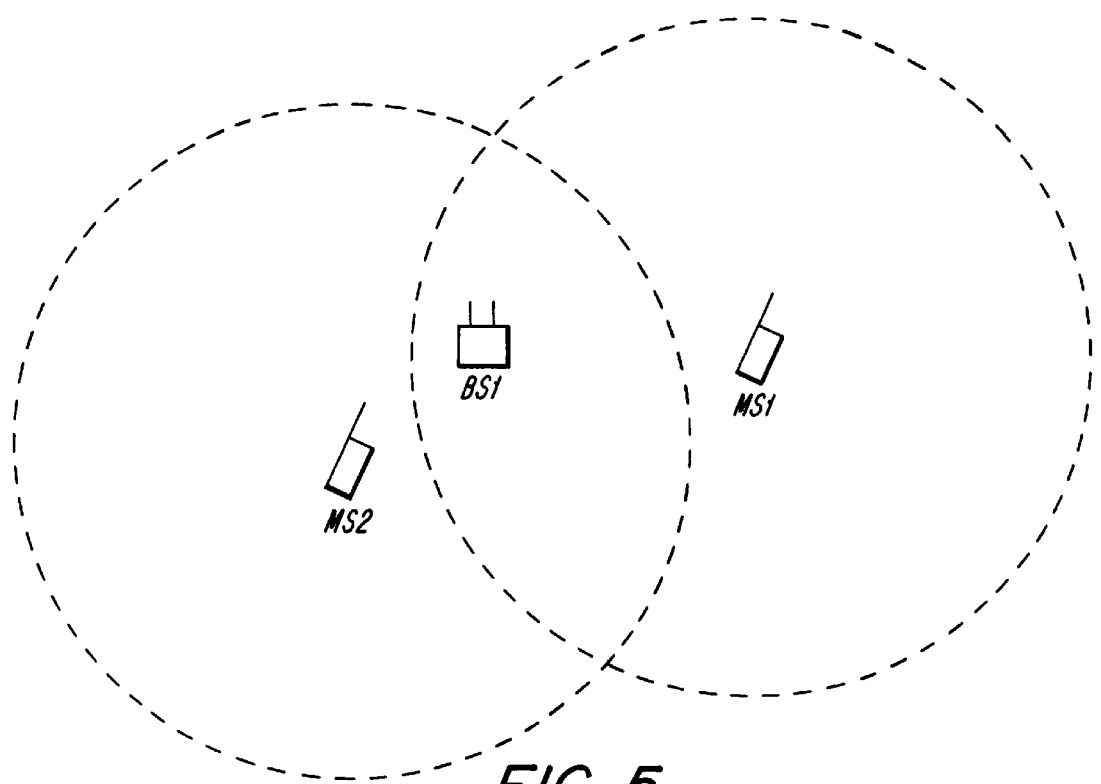
FIG. 5 depicts a single cell system in accordance with an embodiment of the invention, whereby a floating cell is determined by the range of the portable unit's inquiry signal.

An exemplary single-cell system according to the invention is shown in FIG. 5. The range of the inquiry message from the terminals MS1 and MS2 determines the "floating" cells around the terminals. So in this case, it is not the base station that defines the cell, but the terminal. Because, in this example, there are two such floating cells, it is better to speak of a single-base system, rather than a single-cell system. If a base station is inside the cell of the terminal (e.g., the BS1, which is located in each of the floating cells respectively defined by terminals MS1 and MS2), it will respond to an inquiry message. The terminal (MS1, MS2) then obtains the identity and clock of the base station (BS1). With this information, the terminal (MS1, MS2) can quickly access the base station (BS1). If the base station BS1 transmits a low duty cycle beacon, the terminal (MS1, MS2) can also follow this beacon and thereby "lock on" to this base station, as in conventional systems. A roaming terminal according to this concept periodically sends out an inquiry message.

In another aspect of the invention, once a response from a proper base station is returned, the terminal can store the base identity and clock offset for later use, and, if the base station transmits a low-duty cycle beacon, lock to the beacon. If no beacon is provided, the terminal has to periodically retransmit inquiry messages to see if the base station is still in range.

Figure 6:
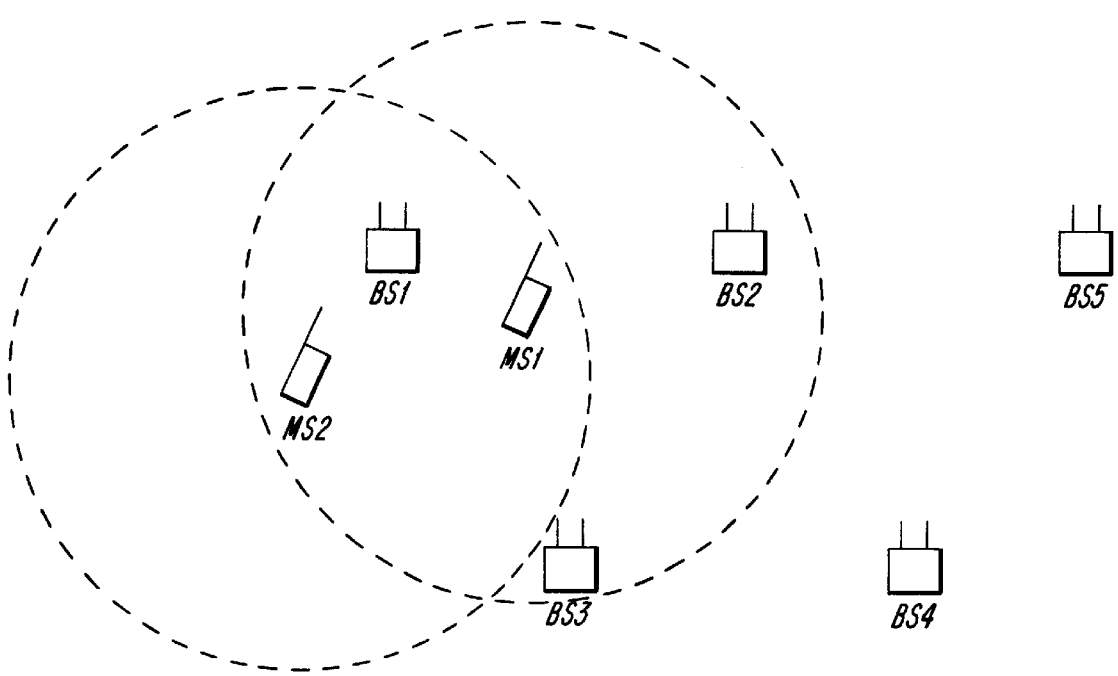
FIG. 6 depicts a multi-cell system in accordance with an embodiment of the invention, whereby a floating cell is determined by the range of the portable unit's inquiry signal.

In a multi-base environment, such as the exemplary system shown in FIG. 6, more than one base station is in range of the terminal. For example, the terminal MS1 has three base stations (BS1, BS2, BS3) within the coverage area of its floating cell. Consequently, after transmitting an inquiry message, several base stations (in fact all the base stations in the terminal's floating cell) will respond. The terminal stores all identities and all clock offsets of the responding base stations. Note that the base stations do not have to be coordinated or synchronized with respect to one another: as long as the base stations and the terminals nominally have the same clock rate, the offsets together with one native clock (e.g., the clock of the terminal), provides sufficient information in the terminal to be able to access all the base stations in range.

Figures 7, 8:
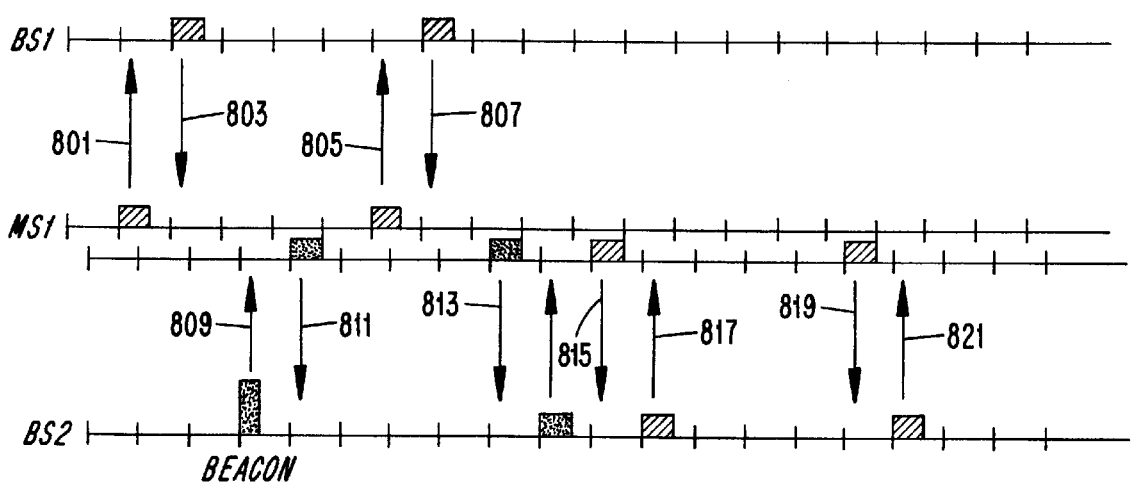
FIG. 7 shows an exemplary inquiry result list of a portable unit in a multi-cell environment, in accordance with an aspect of the present invention.
FIG. 8 is a diagram depicting an example of the timing and direction of signals over the air interface during handover in accordance with an aspect of the present invention.

FIG. 7 depicts an example of the list of base station information stored in the exemplary terminal MS1 of FIG. 6. Base stations BS1, BS2 and BS3 are in range, and their identity, clock offset, and RSSI are given. Base stations BS4 and BS5 are not in range, but for purposes of this example they responded in a previous inquiry procedure, so that the terminal MS1 is aware of their existence, and has accordingly saved their identities and their clock offset values. The present RSSI values for these base stations BS4 and BS5 are too low to be important: base stations BS4 and BS5 are outside the range of the terminal.

The terminal has to repeat the inquiry procedure periodically to find out whether base stations have entered or left the terminal cell due to terminal displacement. In embodiments in which the base stations do not transmit a beacon, prior to a call setup, the terminal has to issue an inquiry to determine which base station is closest, based on received signal strength indication (RSSI). However, if the base stations transmit a low duty cycle, FH beacon, preferably uncoordinated as for example required in the 2.4 GHz ISM band, the terminal can monitor each base station by tuning to it for a short moment when the beacon is transmitted. The terminal can then adjust the offset (to correct for clock drift) and monitor the RSSI. At call setup, the terminal can then select the base station which has had the largest RSSI.

The same procedures can be carried out during an existing connection when a handover from one base station to another base station is required. When the current connection deteriorates, the terminal issues an inquiry to find new and better base stations in its cell. If beacons are available, the monitoring of beacons can be continued during the call and can give an indication of whether it is now better to connect to another base station. However, the transmission of inquiry messages remains important in order to discover new base stations.

With the air interface based on FH and time slots, the terminal can maintain a connection to a current base station while inquiring and connecting to another base station. This is illustrated in FIG. 8. In this case, a duplex traffic connection is presented by exchanging a forward and return packet every 6 slots. The traffic packets are indicated by the shaded rectangles. In the slots that are not used for traffic, the terminal MS1, which in this example is currently connected to BS1 (e.g., see the traffic communicated at steps 801, 803, 805 and 807), can inquire or monitor other base stations. In this case, MS1 has monitored BS2; just after the beacon received from BS2 (step 809), MS1 transmits an access request to BS2 (step 811) (control packets are indicated by black rectangles). When MS1 is ready, the traffic connection is handed over from BS1 to BS2. In this case, BS2 waits until MS1 is ready to do the handover (e.g., step 813). After handover, traffic packets are then exchanged between MS1 and BS2 (e.g., steps 815, 817, 819, 821).

In accordance with another aspect of the invention, the discovery of base stations in the terminal's floating cell and the handover procedures can be accelerated if a base station to which the terminal connects not only reveals information regarding its own status, but that of surrounding base stations as well. For example, consider the situation depicted in FIG. 6. If, after establishing a connection with MS1, BS2 provides MS1 not only with information describing its own features, but also with information describing the addresses and clock offsets of BS1, BS3, BS4, and BS5, then when MS1 needs to connect to a base station other than BS2, it can try to page BS1, BS3, BS4, or BS5 directly, using the address and clock information provided by BS2. So, it is advantageous for each base station to have a list containing information about the surrounding base stations, including their addresses and possibly their clock offsets (with respect to the clock of the base station keeping the list).

Such a list can be constructed by means of messages exchanged via the wired backbone network that connects the base stations. However, if this is a conventional wired network, it will not support these functions because, for example, the base stations may not know that they are adjacent. Of course, the base stations can exchange information via the radio interface. That is, the base stations can carry out inquiry procedures themselves and thus find the other base stations. However, this strategy requires that the range of radio communication from each one of the base stations be far enough to extend to the other base stations. This will normally not be the case for a cellular network, which tries to optimize the coverage with the least number of base stations.

An alternative embodiment for providing the base stations with the information list describing other base stations is to have the mobile terminals supply the information necessary to construct the lists. One or more terminals can monitor the base stations for the purpose of deriving their addresses and mutual clock offsets. This information can then be sent from the terminal(s) to the base station(s) which can then construct and update their lists. When a new terminal arrives at a base station, the terminal will be given the updated lists. This newly arrived terminal can then lock to the base stations in the list and return updated clock information to the base stations if necessary. In this way, a self-learning system results.

When the base stations are installed, none of them have any information lists. The first terminal that enters the area has to find each base station separately through the inquiry procedure. After inquiring and receiving responses, the terminal can inform the base stations of these responses, which in turn can create the base station lists. As more and more terminals that have visited different locations enter the area, the base station list for this area is updated, until it becomes almost complete, that is, until (almost) all of the addresses of the surrounding base stations are known. The clock offset values associated with the base stations are only of temporary use when the base stations are not time synchronized. Due to drift, the offset values become inaccurate. The offset information, however, can be updated by the terminals as well. That is, a moving terminal leaves a trace of base stations whose lists are updated with the latest offset information provided by the terminal.

Figure 9:
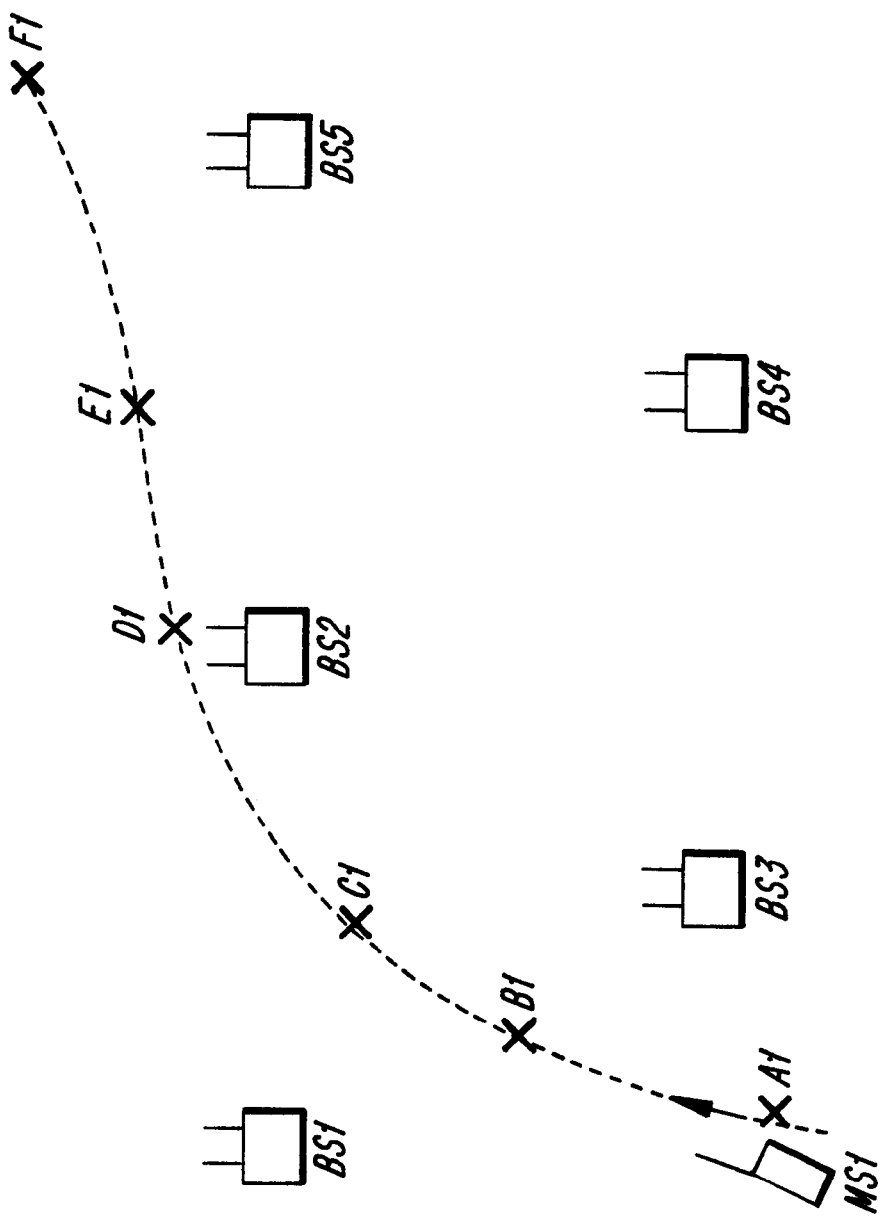
FIG. 9 is a diagram depicting five base stations in an uncoordinated frequency hopping system, and a path of a first mobile terminal in that system.

An example will now be presented to illustrate the concepts of base station lists and of the learning that takes place. FIG. 9 shows five base stations, designated BS1 to BS5. When these base stations are installed, they are merely plugged into the wired backbone (not shown), and no base section lists (BSL) are available. We assume that the base stations can support a low duty cycle FH beacon channel. In addition, all base stations have free-running clocks that are not synchronized with respect to one another but which do have the same nominal rate. A first terminal MS1 enters the area and moves along the route indicated by the dashed line in FIG. 9. The first terminal MS1 periodically transmits inquiry requests to learn about its environment. Assume that at the location A1, it receives a response from BS3. It can then connect to BS3 and lock onto BS3's low duty cycle beacon. Since this is the terminal MS1's first entry into the system, it does not yet have any information to give to BS3. Next, the terminal arrives at B1. Assume here that in response to an inquiry signal, the terminal MS1 receives responses from BS1 and BS3. It can then lock onto the beacon signals of both BS1 and BS3. In addition, it can make a short connection to BS1 to inform this base station that the terminal MS1 hears BS3 as well, and can give BS1 the address of BS3 as well as BS3's clock offset with respect to the clock in BS1. The terminal MS1 can give similar status information to BS3 but now regarding the existence, address and clock offset of BS1. Since the terminal has knowledge of both the clocks in BS1 and in BS3, it can derive offsets and return these to the base stations. BS1 stores the address of BS3 and the clock offset of BS3 (with respect to its own clock) in the BSL1. The base station BS3 stores a similar list regarding BS1. Continuing with the example, assume that when arriving at position C1, BS2 comes within range of terminal MS1 as well. The terminal can then give BS2 the information pertaining to both BS1 and BS3 (the clock offsets may now be determined with respect to the clock of BS2). The new status information received by the terminal from BS2 (such as its address and clock) can now be sent to BS1 and BS3. With this additional information, BS1 and BS3 each extend their respective BSLs. Again continuing with the example, when the terminal MS1 arrives at D1, assume that it loses contact with BS1 and BS3. Consequently, it is now locked onto only BS2. When the terminal MS1 sends inquiry requests, only BS2 responds. However, upon arriving at location E1, BS5 is now in range. The terminal MS1 consequently lock onto both BS2 and BS5. The terminal MS1 can then supply some or all of its stored status information to BS5. In one embodiment of the invention, MS1 supplies BS5 with the status information pertaining only to BS2 in accordance with a strategy in which the only status information conveyed is that which relates to base stations that the terminal MS1 can still "see" or be locked onto via the beacon channel. In accordance with this strategy, the terminal MS1 does not give the status information regarding BS1 and BS3 to BS5 because these base stations BS1 and BS3 are not neighbors of BS5. In contrast, the terminal can give BS2 the status of BS5. Again continuing with the example, assume that at position F1, the terminal almost leaves the area, so that it can now hear only BS5. No new information can be given. The resultant BSLs in the different base stations from this example are shown in FIGS. 10a through 10e. BSLx is stored in BSx, with x ranging from 1 to 5. The clock offset values are exemplary and, for simplicity, are derived from the offset values as given in FIG. 7. In FIG. 7, the offset values are all specified with respect to the clock located in the terminal MS1. To derive the offset information for use in the BSLs, the difference between the offsets listed in FIG. 7 must be determined. For example, in BS1 it is desired to specify offset values relative to the native clock within BS1. Consequently, the magnitude of the difference between the clocks of BS1 and BS2 is +10−(−2030)=2040 clock units, with the offset of BS1 with respect to BS2 being −2040, and the offset of BS2 with respect to BS1 being +2040. Note that the list in BS4 is empty because no terminal has passed this base station yet. For the same reason, BS4 is not in the list of BS3 yet, despite the fact that it is adjacent to BS3.

Figure 11:
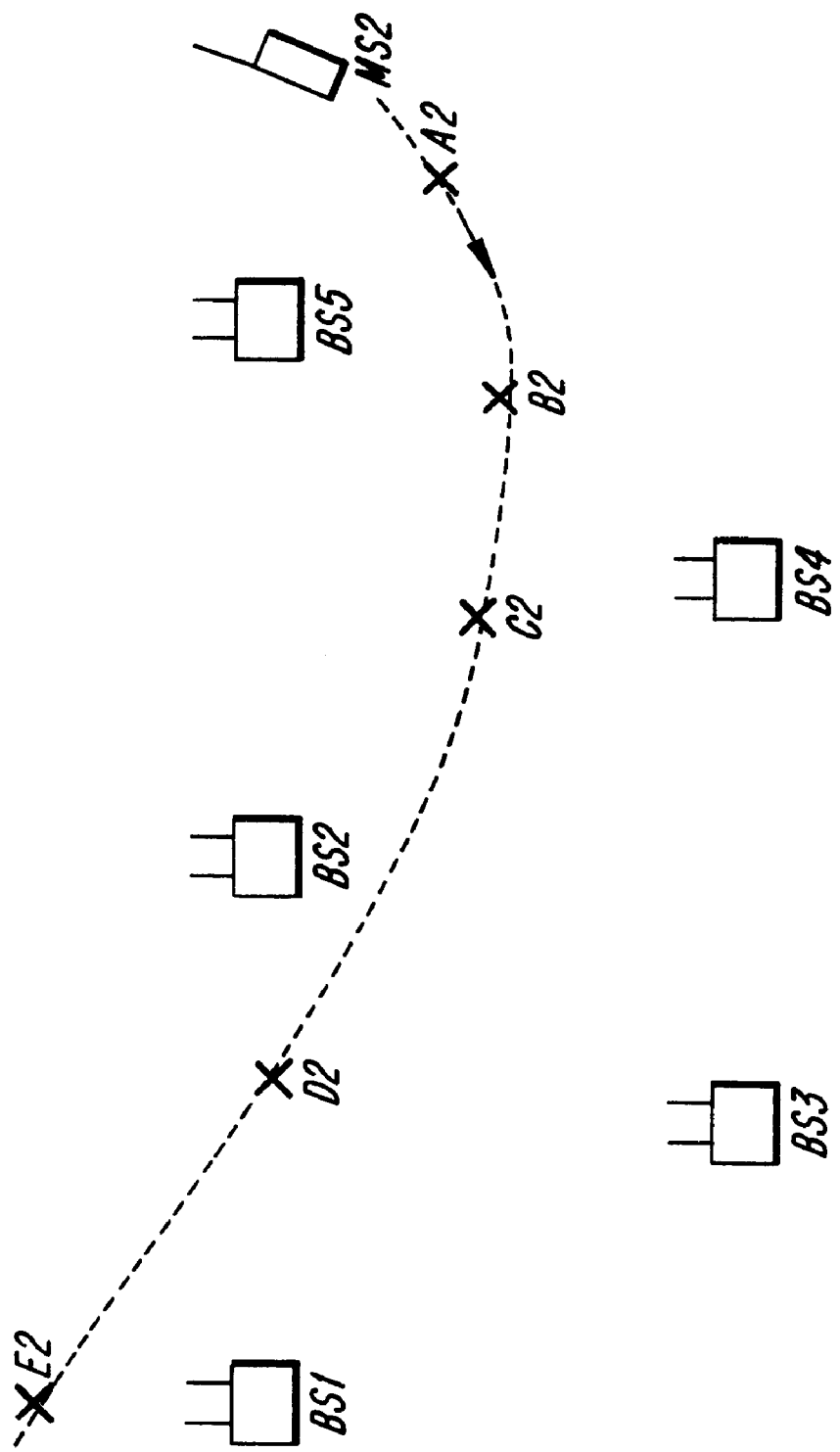
FIG. 11 is a diagram depicting the five base stations in the exemplary uncoordinated frequency hopping system, and a path of a second mobile terminal in that system.

The above example, described with respect to FIGS. 9 and 10a through 10e, shows how each base station can obtain an initial list of information informing it about other base stations in the system. To see how these initial lists can be revised and/or expanded, now suppose that a second terminal MS2 enters the area after the base station lists have been generated. In this example, the second terminal MS2 moves along the path indicated by the dashed line in FIG. 11. At position A2, the terminal MS2 comes within range of BS5 and, after receiving an inquiry response, locks onto the beacon of BS5. Because the second terminal MS2 has just entered the area served by the system, it has no status information to give to BS5. Assume that when the terminal MS2 arrives at position B2, it hears both BS4 and BS5, and can lock onto both of them. By having the terminal MS2 supply information to these two base stations, the BSL5 in BS5 can be extended with the status information pertaining to BS4. Similarly, BS4 can obtain the status information pertaining to BS5 and extend its list accordingly. Continuing with the example, assume that at position C2, the terminal MS2 is locked onto BS5, BS4 and BS2. The terminal then supplies each of these three base stations with status information pertaining to the other two. At position D2, the terminal is locked onto BS2 and BS1 and consequently supplies each of these base stations with updated information. Note in this case that in accordance with one embodiment of the invention, the terminal MS2 gives BS1 the status information pertaining only to BS2, and gives BS2 only that status information pertaining to BS1. It will be understood, however, that this is not an essential feature of the invention, and that in other embodiments, the MS2 could, for example, supply each base station with the status information pertaining to all of the base stations of which it is aware.

Again continuing with the example, assume that upon arriving at position E2, the terminal MS2 is locked onto only BS1. In an embodiment in which a mobile terminal conveys information regarding only those base stations that it is presently locked onto, the terminal MS2 at this point has no new status information that can be exchanged. The BSLs that started out looking like those depicted in FIGS. 10a through 10e when the terminal MS2 first entered the area have now changed to the lists shown in FIGS. 12a through 12e when MS2 leaves the area. Note that BSL1 and BSL3 have not changed BSL1 remained unchanged because MS2 was not locked onto any other base stations when it was within range of BS1. BS3 remained unchanged because BS3 was never within range of MS2. Consequently, BS3 still has no information regarding BS4, because this would require that a terminal pass through a position in which both BS4 and BS3 are in range. The existing offsets already present in FIGS. 10a through 10e have not changed in FIGS. 12a through 12e because, in the above example, it was assumed that the offsets were still sufficiently accurate. If, due to drift, the offset values had changed, then MS2 would have updated the offset values so that the BSLs would have the latest offset values.

As more terminals cross the area, the BSLs are filled and continuously updated. The system is self-learning in that it fills the BSLs itself with the help of the terminals. Assuming that other terminals take different paths through the area and similarly perform the status update information described above, it is possible for the BSLs to be completely filled. An exemplary set of completely filled BSLs are depicted in FIGS. 13a through 13e. At this point, no new address information can be provided by the terminals; only updates of clock offset values can be carried out.

In another aspect of the invention, a procedure may be provided to limit the lifetime of each element in the list. That is, base stations (and their associated information) can be removed from the list. When base stations are physically removed from the system, they vanish from the lists as well. This may be accomplished as follows: Each time one or more elements in a list are updated, the life span of an element that is not updated is decremented. If the life span expires, that is if many updates have been made without the considered element ever having been affected, then the element is removed from the list. The implementation can be made simple with a lifetime counter being provided for each element. When an element is updated, its counter is reset to a large value N (representing its life span). If the list is updated without this particular element being updated, then the corresponding counter is decreased by 1. If the counter reaches zero, the element (i.e., the information pertaining to this base station) is removed from the list.

Figure 14:
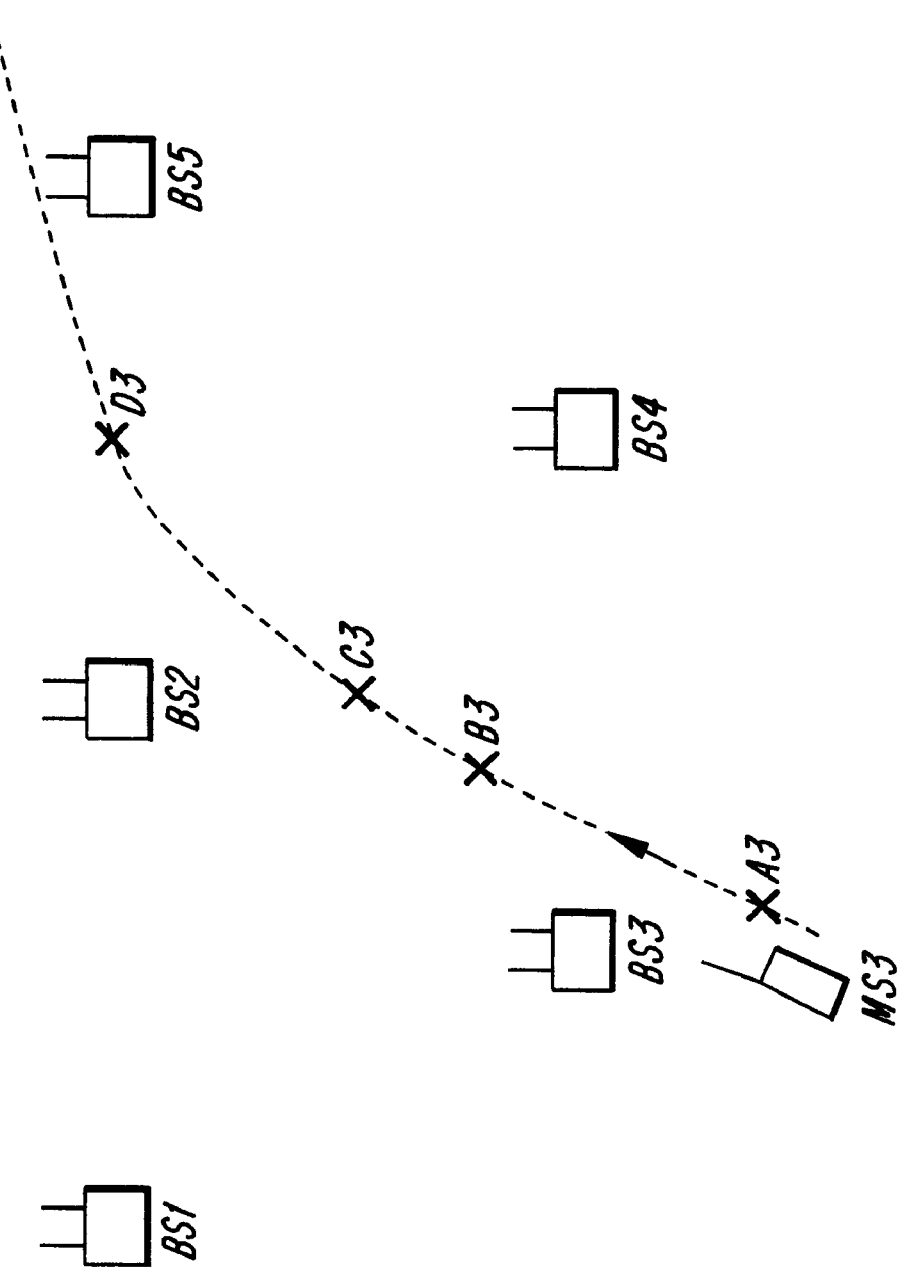
FIG. 14 is a diagram depicting the five base stations in the exemplary uncoordinated frequency hopping system, and a path of a third mobile terminal in that system.

An example will now be presented to illustrate the benefits that are achievable by means of the base station lists. For this example, suppose that the BSLs of the previous examples are filled as shown in FIGS. 13a through 13e. Suppose further that a new terminal MS3 enters the area and follows the route as illustrated by the dashed line in FIG. 14. First, the terminal MS3 arrives at location A3 and establishes a real-time connection between itself and BS3. MS3 may perform an inquiry procedure as described earlier, and share its information with BS3 and any other base stations that responded. It will be apparent from the earlier examples, however, that MS3's inquiry procedure will yield information about only those base stations that are within range of the inquiry signals.

However, in accordance with this aspect of the invention, upon establishing the connection, the BS3 provides MS3 with its list BSL3. This list, which includes information about base stations that are not within range of MS3, is not yet of any use to the terminal MS3. Even as the terminal MS3 passes through the position B3, it is still able to remain connected to the base station BS3. However, when MS3 later arrives at position C3, the signals of BS3 start to deteriorate due to the distance. As a consequence, terminal MS3 has to connect to a new base station in order to continue the connection. When the connection carries real-time information, a smooth transition from one base station to another base station is required. The terminal can of course carry out inquiry procedures to learn about its environment. However, this learning is really not necessary since the terminal has received BSL3. Therefore it knows what base stations are around. It can try to page each of the base stations in the list directly. Since the addresses and the clock offsets are known, a fast setup is obtained if the base station is in range. In the example depicted in FIG. 14, the base station that is best to connect to from position C3 is base station BS2. It is preferred that the terminal connect to this base station BS2 prior to reaching the point at which a forced handover will be required. If the terminal can lock to the beacon of BS2 while the link to BS3 is still acceptable, then the amount of effort required to perform the handover from BS3 to BS2 when it is really required will be reduced. While at position C3, the connection is handed over from BS3 to BS2, but the terminal MS3 should remain locked to the beacon of BS3. The reason for this is to make it easier to hand back the connection to BS3 in the event that the terminal moves back in the direction of BS3. In the exemplary embodiment, the terminal is locked to the beacon channel of as many base stations as possible. Further in accordance with the invention, upon connecting to BS2, the terminal MS3 receives the list BSL2. In this list, information about BS5 and BS4 (as well as BS3) are included, which information can be used advantageously at position D3 when a handover from BS2 to BS5 will have to be carried out.

In yet another aspect of the invention, the system is further improved by making clock drift predictions in each of the base stations, which predictions can increase the accuracy of the clock offset values. In the embodiments described above, each base station takes the offset values as provided by the terminals and overwrites the older offset values previously stored in its BSL. These stored offset values are not changed until a new update of a terminal arrives. However, when a new update is received, the change in offset values and the time elapsed between the updates indicates the drift between the clocks to which the offset refers. For example, if at time T1 the offset value is X1 and at time T2, the offset value is X2, the drift may be calculated via (X2-X1)/(T2-T1). If we assume as a first order approximation a constant drift, the base station can predict the offset value X3 that is expected to occur at time T3 without actually receiving an update at time T3:

$$X3 = X2 + \frac{(X2 - X1)}{(T2 - T1)} \times (T3 - T2)$$

Of course, alternative embodiments may substitute higher-order approximations of the clock drift in place of the first-order approximation illustrated above.

Therefore, the clock offset values can continuously be updated by the base station according to the equation above. Any actual offset value update received by a terminal can be used to adjust the prediction and the drift rate estimates. Note that the drift is calculated separately for each offset value, since for each offset value, two different base stations are involved. Further, the drift rate estimate for each base station should be stored along with the corresponding clock offset value in the base station's BSL.

In summary then, the described system uses base stations which either do not transmit a beacon or control channel at all, or alternatively transmit a FH beacon at a very low duty cycle. The portable unit moving in the area covered by the base stations (or alternatively viewed as those base stations coming within range of the portable unit's own floating cell) repeatedly inquires after the status of its environment, for the purpose of discovering which base stations are in range and what their status is. During the inquiry process, the portable unit obtains information regarding the hopping pattern and the phase in this hopping pattern for each base station in range. In preferred embodiments, the hopping pattern is based on the identity of the base station, and the phase in the hopping sequence is based on a free running clock in the base station. If the portable obtains the clock of the base station and stores it as an offset to its own clock, it remains in synchrony to this base station as long as the clocks in the portable and the base station run in synchrony. In order to adjust for clock drifts, the clock offset must be adjusted periodically. By the inquiry procedure, the portable can obtain all the addresses and clock offsets of the base stations in range. The base stations themselves do not have to be coordinated; the only requirement is that all units (portables and base stations) use the same nominal clock rate.

If the base stations transmit a FH beacon, the portable unit can monitor the base stations using the synchronization information obtained during the inquiry procedure. It can then constantly adjust the clock offset to correct for clock drift, and can track the signal level at which this base station is received. If the base station does not send a beacon at all, the inquiry process should be carried out more frequently.

In some respects, the described concept can be considered as a reverse action to the one carried out in conventional cellular systems. In cellular systems, the network builds cells; the transmission of the base stations defines the cells. In the system according to this invention, the cells are determined by the portable, which finds out which base stations are in range and are present in its own "floating" cell. Therefore, the portable regularly transmits a signal to discover new base stations in its cell. By means of the inquiry process, the portable obtains a picture of how many base stations are present in its floating cell, and at what distance these base stations are located. If the base station sends a (FH) beacon, the portable unit can also monitor the base stations in-between inquiry procedures.

The inquiry and monitoring should be carried out more frequently during a connection in order to perform a handover in time before the current base station leaves the cell of the portable.

The advantages with this concept are 1) the base stations do not have to be coordinated, and 2) little capacity is wasted and unnecessary interference is avoided because the base stations not supporting a portable either do not transmit, or otherwise transmit at very low duty cycle.

In another aspect of the invention, the base stations collect inquiry information regarding other, nearby base stations. This information can then be transferred to a mobile terminal in connect mode. The mobile terminal can then use this information to effectively seek other base stations and to reduce scan time. The information distributed in this way may first be collected by an arbitrary mobile terminal and then transferred to the base stations as it comes into contact with them. These base stations, which store the information, can later supply the stored information to other mobile terminals with which it comes into contact. These mobile terminals can then, in turn, use the information supplied by already-encountered base stations to more easily establish communication with other base stations that they newly make contact with.

In still another aspect of the invention, a base station uses several samples of clock offsets pertaining to a given one of the other, and uses these, along with knowledge of how much time elapsed between those samples, to determine drifts between their respective clock rates. These drift values can then be used to determine more accurate predictions of future offset values.

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A mobile unit for use in an uncoordinated frequency hopping cellular system, the mobile unit comprising:
   wireless means for performing an inquiry procedure that yields information pertaining to a set of base stations; and
   wireless means for supplying, to at least one of the base stations in the set, the information pertaining to at least one other base station in the set;
   wherein the information includes clock offset information representing a difference between a clock value associated with said at least one of the base stations and a clock value associated with at least one of the other base stations in the set, wherein the clock values are independent.

2. The mobile unit of claim 1, wherein the information includes address information corresponding to the set of base stations.

3. The mobile unit of claim 1, further comprising:
   wireless means for receiving additional information from said at least one of the base stations, wherein the additional information includes information pertaining to at least one base station that is not in the set of base stations.

4. The mobile unit of claim 4, further comprising:
   means for using the additional information to establish communication with said at least one base station that is not in the set of base stations.

5. The mobile unit of claim 5, wherein the additional information includes synchronization information pertaining to said at least one base station that is not in the set of base stations.

6. The mobile unit of claim 1, further comprising:
   wireless means for receiving additional information from said at least one of the base stations, wherein the additional information includes information pertaining to at least one base station that is in the set of base stations.

7. An uncoordinated frequency hopping cellular system, comprising:
   a mobile unit comprising:
      wireless means for performing an inquiry procedure that yields information pertaining to a set of base stations; and
      wireless means for supplying, to at least one of the base stations in the set, the information pertaining to at least one other base station in the set; and
   the set of base stations, each comprising:
      means for supplying own information to the mobile unit; and
      means for receiving the information pertaining to at least one other base station in the set;
   wherein the information includes clock offset information representing a difference between a clock value associated with said at least one of the base stations and a clock value associated with at least one of the other base stations in the set, wherein the clock values are independent.

8. The system of claim 7, wherein the information includes address information corresponding to the set of base stations.

9. The system of claim 7, wherein:
   the mobile unit further comprises:
      wireless means for receiving additional information from said at least one of the base stations, wherein the additional information includes information pertaining to at least one base station that is not in the set of base stations; and
   said at least one of the base stations further comprises:
      means for supplying the additional information to the mobile unit.

10. The system of claim 9, further comprising:
    said at least one base station that is not in the set of base stations; and wherein:
       the mobile unit further comprises:
          means for using the additional information to establish communication with said at least one base station that is not in the set of base stations.

11. The system of claim 10, wherein the additional information includes synchronization information pertaining to said at least one base station that is not in the set of base stations.

12. The system of claim 7, wherein:
the mobile unit further comprises:
wireless means for receiving additional information from said at least one of the base stations, wherein the additional information includes information pertaining to at least one base station that is in the set of base stations; and
said at least one of the base stations further comprises:
means for supplying the additional information to the mobile unit.

13. A base station for use in an uncoordinated frequency hopping cellular system, the base station comprising:
wireless means for supplying own information to a mobile unit; and
means for receiving, from the mobile unit, other information pertaining to at least one other base station in the system;
wherein the other information includes clock offset information for establishing communication with said at least one other base station in the system, wherein the clock offset information depends on independent clocks in the base station and the at least one other base station.

14. The base station of claim 13, wherein the own information includes address information for establishing communication with the base station, and the other information includes other address information for establishing communication with said at least one other base station in the system.

15. The base station of claim 13, further comprising:
wireless means for supplying, to the mobile unit, additional information that includes information pertaining to at least one base station that has not responded to an inquiry procedure performed by the mobile station.

16. The base station of claim 15, wherein the additional information includes synchronization information pertaining to said at least one base station that is not within the geographical region defined by the location of the mobile station.

17. The base station of claim 13, further comprising:
wireless means for supplying, to the mobile unit, additional information that includes information pertaining to at least one base station that has responded to an inquiry procedure performed by the mobile station.

18. The base station of claim 13, further comprising:
means for estimating a rate of clock drift between an own clock located within the base station and another clock located within another base station in the system.

19. The base station of claim 18, further comprising:
means for using the estimated rate of clock drift to correct a stored clock offset value representing a difference between a clock value associated with the own clock and a clock value associated with said another clock located within said another base station in the system.

20. A method of operating a mobile unit for use in an uncoordinated frequency hopping cellular system, the method comprising the steps of:
performing in inquiry procedure that yields information pertaining to a set of base stations; and
supplying, to at least one of the base stations in the set, the information pertaining to at least one other base station in the set;
wherein the information includes clock offset information representing a difference between a clock value associated with said at least one of the base stations and a clock value associated with at least one of the other base stations in the set, wherein the clock values are independent.

21. The method of claim 20, wherein the information includes address information corresponding to the set of base stations.

22. The method of claim 20, further comprising the steps of:
receiving additional information from said at least one of the base stations, where in the additional information include s information pertaining to at least one base station that is not in the set of base stations.

23. The method of claim 22, further comprising the steps of:
using the additional information to establish communication with said at least one base station that is not in the set of base stations.

24. The method of claim 23, wherein the additional information includes synchronization information pertaining to said at least one base station that is not in the set of base stations.

25. The method of claim 20, further comprising the steps of:
receiving additional information from said at least one of the base stations, wherein the additional information includes information pertaining to at least one base station that is in the set of base stations.

26. A method of operating an uncoordinated frequency hopping cellular system, comprising the steps of:
in a mobile unit, performing the steps of:
performing an inquiry procedure that yields information pertaining to a set of base stations; and
supplying, to at least one of the base stations in the set, the information pertaining to at least one other base station in the set, wherein the information includes clock offset information representing a difference between a clock value associated with said at least one of the base stations and a clock value associated with at least one of the other base stations in the set, wherein the clock values are independent; and
in each base station in the set of base stations, performing the steps of:
supplying own information to the mobile unit; and
receiving the information pertaining to at least one other base station in the set.

27. The method of claim 26, wherein the information includes address information corresponding to the set of base stations.

28. The method of claim 26, wherein:
the mobile unit further performs the step of:
receiving additional information from said at least one of the base stations, wherein the additional information includes information pertaining to at least one base station that is not in the set of base stations; and
said at least one of the base stations further performs the step of:
supplying the additional information to the mobile unit.

29. The method of claim 28, wherein:
the mobile unit further performs the steps of:
using the additional information to establish communication with said at least one base station that is not in the set of base stations.

30. The method of claim 29, wherein the additional information includes synchronization information pertaining to said at least one base station that is not in the set of base stations.

31. The method of claim 26, wherein:
the mobile unit further performs the step of:
receiving additional information from said at least one of the base stations, wherein the additional information includes information pertaining to at least one base station that is in the set of base stations; and
said at least one of the base stations further performs the step of:
supplying the additional information to the mobile unit.

32. A method of operating a base station for use in an uncoordinated frequency hopping cellular system, the method comprising the steps of:
supplying own information to a mobile unit; and
receiving, from the mobile unit, other information pertaining to at least one other base station in the system;
wherein the other information includes clock offset information for establishing communication with said at least one other base station in the system, wherein each respective clock is independent.

33. The method of claim 32, wherein the own information includes address information for establishing communication with the base station, and the other information includes other address information for establishing communication with said at least one other base station in the system.

34. The method of claim 32, further comprising the steps of:
supplying, to the mobile unit, additional information that includes information pertaining to at least one base station that has not responded to an inquiry procedure performed by the mobile station.

35. The method of claim 34, wherein the additional information includes synchronization information pertaining to said at least one base station that has not responded to the inquiry procedure performed by the mobile station.

36. The method of claim 32, further comprising the steps of:
supplying, to the mobile unit, additional information that includes information pertaining to at least one base station that has responded to an inquiry procedure performed by the mobile station.

37. The method of claim 32, further comprising the steps of:
estimating a rate of clock drift between an own clock located within the base station and another clock located within another base station in the system.

38. The method of claim 37, further comprising the steps of:
using the estimated rate of clock drift to correct a stored clock offset value representing a difference between a clock value associated with the own clock and a clock value associated with said another clock located within said another base station in the system.

39. A mobile unit for use in an uncoordinated frequency hopping cellular system, the mobile unit comprising:
wireless means for communicating with a first base station in the uncoordinated frequency hopping cellular system; and
means for receiving information from the first base station, wherein the information includes addresses and clock offset values of neighboring base stations in the uncoordinated frequency hopping cellular system;
wherein each of the clock offset values represents a difference between a clock value associated with the first base station and a clock value associated with a corresponding one of the neighboring base stations, wherein the clock values are independent.

40. The mobile unit of claim 39, further comprising:
means for using the information from the first base station to establish communication with at least one of the neighboring base stations.

41. The mobile unit of claim 39, further comprising means for supplying additional information to the first base station, wherein the additional information includes address and clock offset information pertaining to another base station in the uncoordinated frequency hopping cellular system.

42. The mobile unit of claim 41, further comprising:
wireless means for performing an inquiry procedure that yields the additional information.

43. A base station for use in an uncoordinated frequency hopping cellular system, the base station comprising:
wireless means for communicating with a mobile unit in the uncoordinated frequency hopping cellular system; and
means for supplying information to the mobile unit, wherein the information includes addresses and clock offset values of neighboring base stations in the uncoordinated frequency hopping cellular system;
wherein each of the clock offset values represents a difference between a clock value associated with the base station and a clock value associated with a corresponding one of the neighboring base stations, wherein the clock values are independent.

44. The base station of claim 43, further comprising means for receiving additional information from the mobile unit, wherein the additional information includes address and clock offset information pertaining to another base station in the uncoordinated frequency hopping cellular system.

45. An uncoordinated frequency hopping cellular system, comprising:
a mobile unit comprising:
wireless means for communicating with a first base station in the uncoordinated frequency hopping cellular system; and
means for receiving information from the first base station, wherein the information includes addresses and clock offset values of neighboring base stations in the uncoordinated frequency hopping cellular system, wherein the clock offset values are independent; and
the first base station comprising:
wireless means for communicating with the mobile unit; and
means for supplying the information to the mobile unit.

46. The system of claim 45, wherein each of the clock offset values represents a difference between a clock value associated with the first base station and a clock value associated with a corresponding one of the neighboring base stations.

47. The system of claim 45, wherein the mobile unit further comprises:
means for using the information from the first base station to establish communication with at least one of the neighboring base stations.

48. The system of claim 45, wherein the mobile unit further comprises means for supplying additional information to the first base station, wherein the additional information includes address and clock offset information pertaining to another base station in the uncoordinated frequency hopping cellular system.

49. The system of claim 48, wherein the mobile unit further comprises:

wireless means for performing an inquiry procedure that yields the additional information.

50. A method of operating a mobile unit for use in an uncoordinated frequency hopping cellular system, the method comprising the steps of:

communicating with a first base station in the uncoordinated frequency hopping cellular system; and receiving information from the first base station, wherein the information includes addresses and clock offset values of neighboring base stations in the uncoordinated frequency hopping cellular system, wherein the clock offset values are independent.

51. The method of claim 50, wherein each of the clock offset values represents a difference between a clock value associated with the first base station and a clock value associated with a corresponding one of the neighboring base stations.

52. The method of claim 50, further comprising the steps of:

using the information from the first base station to establish communication with at least one of the neighboring base stations.

53. The method of claim 50, further comprising the step of supplying additional information to the first base station, wherein the additional information includes address and clock offset information pertaining to another base station in the uncoordinated frequency hopping cellular system.

54. The method of claim 53, further comprising the step of:

performing an inquiry procedure that yields the additional information.

55. A method of operating a base station for use in an uncoordinated frequency hopping cellular system, the method comprising the steps of:

communicating with a mobile unit in the uncoordinated frequency hopping cellular system; and supplying information to the mobile unit, wherein the information includes addresses and clock offset values of neighboring base stations in the uncoordinated frequency hopping cellular system, wherein the clock offset values are independent.

56. The method of claim 55, wherein each of the clock offset values represents a difference between a clock value associated with the base station and a clock value associated with a corresponding one of the neighboring base stations.

57. The method of claim 55, further comprising the step of receiving additional information from the mobile unit, wherein the additional information includes address and clock offset information pertaining to another base station in the uncoordinated frequency hopping cellular system.

* * * * *